Dec. 11, 1928.
E. A. WHITE
1,694,675
FRUIT CLEANING MECHANISM
Filed Oct. 23, 1926         3 Sheets-Sheet 1
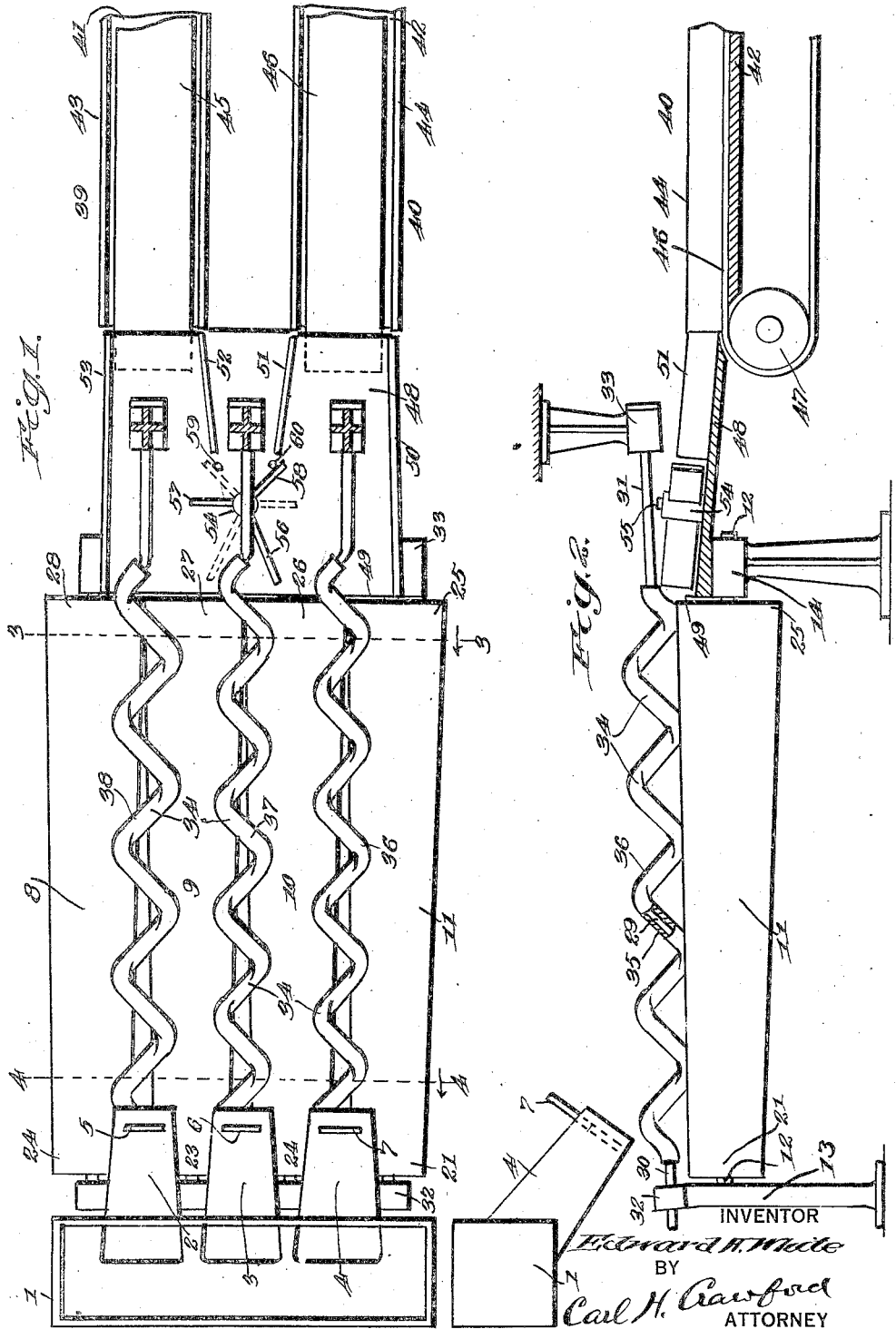

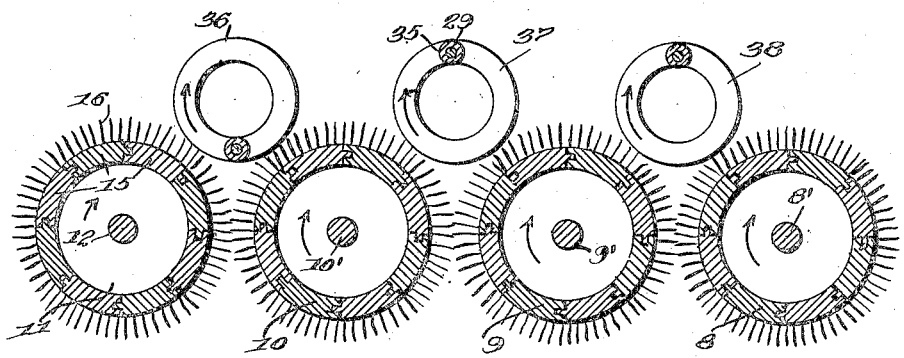
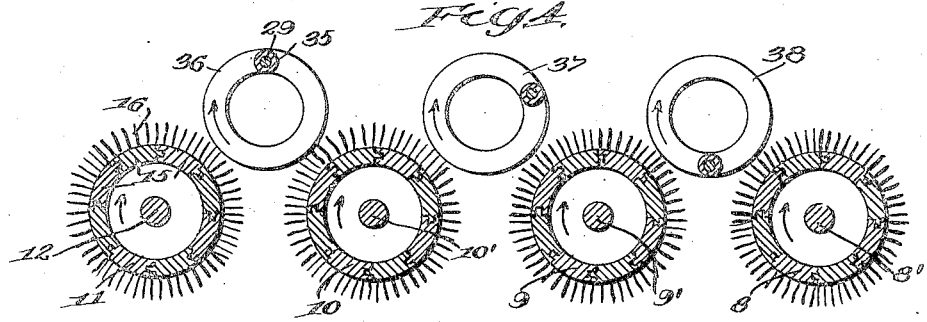
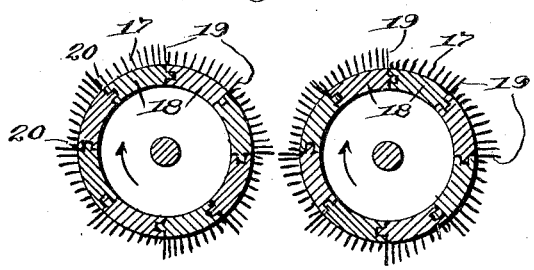

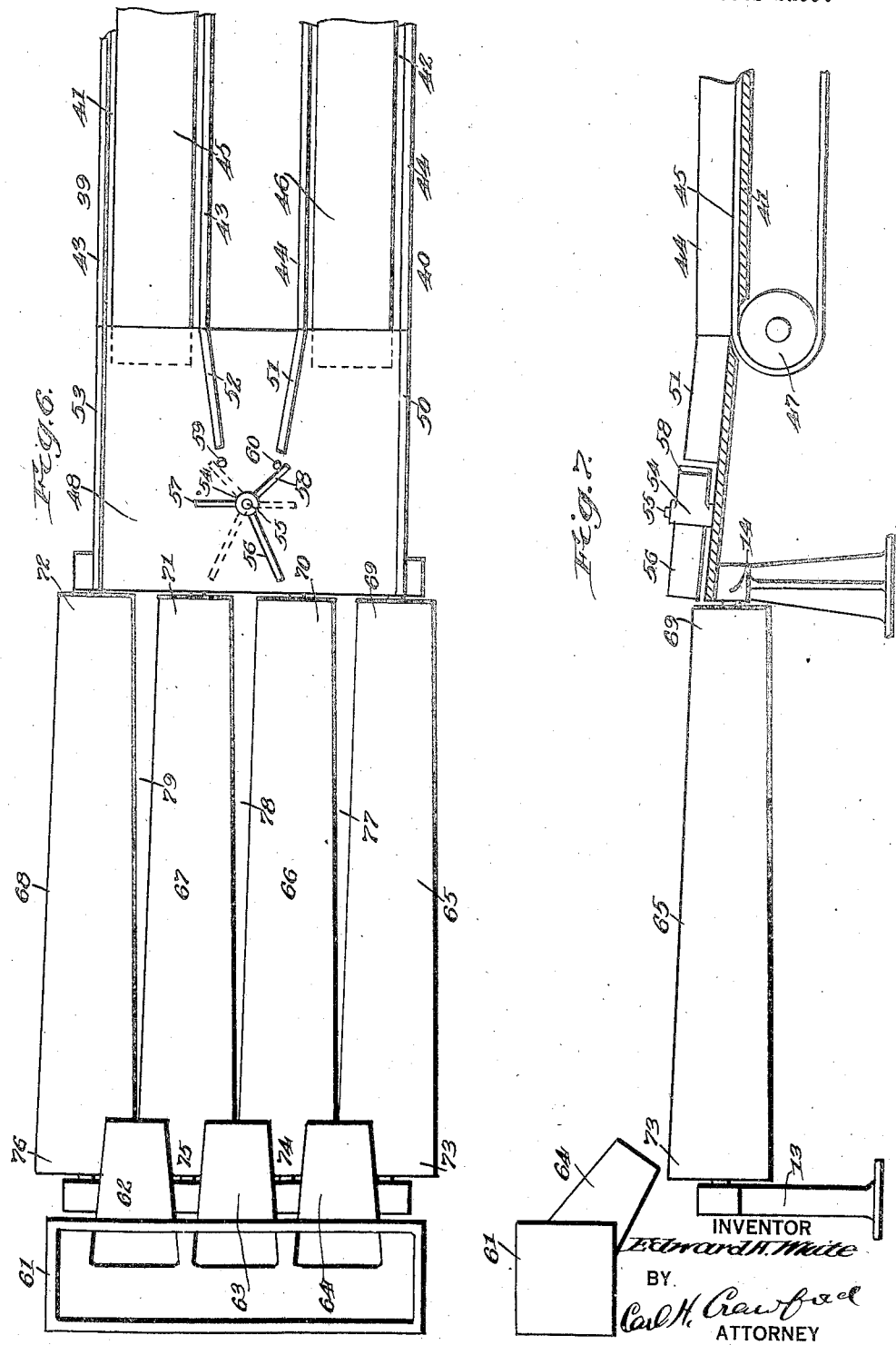

Patented Dec. 11, 1928.

UNITED STATES PATENT OFFICE.

EDWARD A. WHITE, OF LEWISTON, IDAHO.

FRUIT-CLEANING MECHANISM.

Application filed October 23, 1926. Serial No. 143,655.

This invention relates to improvements in fruit cleaning machines.

The invention involves cleaning elements in the form of rotary members having peripherally disposed cleaning surfaces, the surfaces of adjacent members coacting on fruit that is operatively interposed therebetween.

It is a feature of my invention to employ cleaning members in the form of rollers which are rotated in the same direction whereby the interposed fruit will have imparted to it a rubbing action by one roller in one direction and a like rubbing action by the companion roller in another direction.

In the most improved embodiment, the interposed fruit is peripherally supported by the cleaning rollers above the axes thereof and as the fruit is being cleaned, it advances or is advanced, longitudinally of the rollers from an ingressing or feeding-in point to an egressing or delivery point.

It is a feature of my invention to provide the rollers with fruit cleaning surfaces of yielding or resilient material, preferably of a bristle type, the material being sufficiently resilient to yield not only to any pressure due to interposition of the fruit but also to the weight of the fruit entities. Thus, while the normal posture of the cleaning material is convex, still, because of the yielding nature of the material, the fruit is actually wiped and cleaned by a concave surface, or rather, that portion of the surface with which the fruit is engaged, becomes concave by reason of such engagement. Hence, even though the surface is normally convex, I obtain the advantage of a concave wiping surface.

It is a feature of my invention not only to rotate the cleaning rollers in the same direction, but also at the same speed, hence, any tendency of the fruit to jump up by reason of the lifting action of one roller will be compensated by the downward thrust imparted by the companion roller, therefore, I am enabled to operate the rollers at a relatively high speed.

It is a further feature of my invention to employ cone shaped cleaning rollers rotatable about parallel axes with the larger ends of the rollers substantially in contact and the smaller ends in separated relation so that in some linear portions of the travel of the fruit, the latter meets with an increasing extent or degree of wiping action.

In one form of my invention, I employ positive means for advancing the fruit, and preferably, this means is of a nature to keep the fruit entities in separated relation along the path of travel thereof.

In another form of my invention, I employ a downward inclined path of travel for the fruit whereby the latter will advance by gravity as it is acted upon by the reversely moving cleaning surfaces. It is a special feature of my invention to obtain this declining path of travel by employing cone shaped rollers and rotating them about parallel axes.

My invention has many other features and advantages which will be more fully described in connection with the accompanying drawings and which will be more particularly pointed out in and by the appended claims.

In the drawings;

Fig. 1, is a plan view of a fruit cleaning machine embodying the most improved form of my invention.

Fig. 2, is a view in side elevation thereof.

Fig. 3, is a sectional view on line 3—3 of Fig. 1.

Fig. 4, is a sectional view on line 4—4 of Fig. 1.

Fig. 5, is a sectional view of a modified form of cleaning device.

Fig. 6, is a plan view of a modified form of cleaning device showing the rollers in a different disposition from the preferred form and omitting the positive advancing means of the preferred form.

Fig. 7, is a view in side elevation thereof.

Like characters of reference designate similar parts throughout the different figures of the drawings.

I will first describe the preferred form shown in Figs. 1 to 4, to which reference will now be made. I have shown a feed device which consists of a receiver 1 into which the fruit is deposited irrespective of grade or size and in what is termed, the "orchard run". This receiver is shown provided with as many chutes, 2, 3 and 4, leading downwardly therefrom as there are fruit paths to be fed, and it will be noted that the delivery of fruit is from above the cleaning machine down onto which the fruit is fed or delivered. I preferably make the chutes internally large enough to accommodate the largest size fruit entity, and hence, in practice, only one entity at a time can pass downwardly through the chutes. This is especially desirable for the preferred form of the invention where a fruit advancing means is employed to advance the fruit entities in separated relation, although not essential in the modified form where no advancing means is employed. If desired, the chutes 2 to 4 may have each an adjustable gate, as indicated at 5, 6 and 7, so that delivery, one at a time, may be effectively made in the event that the machine is operating on a fruit of small size, or any intermediate size less than the largest size.

Each chute delivers to what I will term a fruit path and each of said paths is formed by coacting cleaning rollers which I will next describe in detail.

Chute 2, delivers to a path formed by or between rollers 8 and 9, and chute 3, delivers to a path formed by rollers 9 and 10, while chute 4 delivers to a path formed by rollers 10 and 11. It will thus be seen that there is an uneven number of fruit paths formed by an even number of rollers. The rollers are mounted on shafts, one being indicated at 12, and the shafts are journalled at their ends in bearings 13 and 14, as shown in Fig. 2. Any form of driving means may be employed to rotate the shafts and the rollers in the same direction and at the same speed, such means being clearly within the province of mechanical skill. However, it is important, in this form of the invention to note that the rollers operate on parallel axes, as will be clearly seen in Figs. 1, 3 and 4, as this arrangement not only simplifies the driving of said rollers, but also affords certain additional advantages which will be presently described.

I will next describe a feature of construction which I claim is novel in this type of machine.

As all the rollers are alike, only one need be described in detail. Roller 11, is made up of a plurality of staves 15, each of convex transverse form, as shown, the staves being laterally joined in any suitable manner, as by mortice and tenon construction, as clearly shown in Figs. 3 and 4, to make up the roller shown. Each stave has suitably secured thereto the integers of cleaning material employed, and in the present form, I employ soft bristles 16. Thus, the tufts of bristles are secured to the staves, preferably although not necessarily, before the staves are joined to form a roller, and after the staves have been set up and joined, as shown, the roller is provided with a peripherally projecting brush that is continuous not only circumferentially but also longitudinally thereof. In the preferred form, as will be seen in Figs. 3 and 4, the bristles are of uniform radial length.

In Fig. 5, I have shown a modification wherein the bristles 17, of each stave 18, are of such graduated radial length as to form convexly disposed arcuate brush sections in such a manner as to form projecting shoulders 19 and corresponding depressions 20. Thus, the surface is irregular, longitudinally of the roller, such irregularity being of a symmetrical order of arrangement. This form is especially advantageous where poison sediment and other extraneous or foreign matter on the fruit is excessive, and where it is especially necessary to clean out cavities such as the blossom and stem ends of fruit such as apples. It will be noted from Fig. 5, that the projecting shoulders 19 face in the direction in which the roller is rotated, and hence the interposed fruit will be subjected to the action of upwardly and downwardly moving shoulders. It may be here stated, that in any event, and in all forms of the invention, the bristles will be sufficiently flexible to readily bend and flex into wiping engagement with the fruit, such engagement being gentle enough to entirely avoid injury to the fruit.

As previously stated, the cleaning members are herein shown conical in form, and it is a feature of my invention to provide an inclined path for the fruit, this inclination being attained, in the present construction, not by actually inclining the rollers, but by forming them conical. In the preferred form, as shown in Fig. 1, the smaller ends of the rollers 21 to 24, are disposed at the fruit intake end of the machine and the spacing of the rollers is such that the peripheries of the larger ends 25 to 28, are substantially in contact and located at the egressing or delivery end of the machine. Thus, there will be a considerable and appreciable space between the rollers at the intake end, as shown in Figs. 1 and 4, so that when the fruit entities are delivered thereto, they will descend between the rollers and occupy a relatively lower position near the intake end than at the delivery end. In other words, the entities will descend nearer the axis of rotation of the rollers, at the intake ends thereof, as shown in Fig. 4, as compared to the position of said entities as shown in Fig. 3. Consequently, as the fruit advances from the left to the right of Fig. 1, it will be ascending toward the point of delivery.

I will next describe an improved means for advancing the fruit along the fruit paths, and as each means is alike in construction and operation, only one need be described in detail.

My improved advancing means is of a screw-like character and preferably of a spiral form and is shown in the form of a rod or pipe 29, having its ends 30 and 31 journalled in suitable bearings 32 and 33. I preferably employ a pendent form of bearing, as shown at 33, to avoid obstruction for my novel delivery and divergent means which will be later described. Said rod 29, is shaped to form a spiral, as shown, the convolutions 34, or rather the convoluted portions being covered by rubber or other soft and yielding material 35, to avoid injury to the fruit. In the present form, I have shown the convoluted portions of the same radial diameter throughout the length of each advancer, and hence, I have journalled the advancing devices to rotate about axes slightly angular to the axes of rotation of the rollers, as will be seen by reference to Fig. 2. Because of the space afforded between the smaller ends of the conical rollers, this disposition of the advancer permits the convoluted portions to sweep below, or lower at the spaced ends than at the contacting ends of the rollers. If desired, the advancer could be made tapering, in which event its axis could be parallel with the axes of its coacting rollers. Suitable means will be provided, which it is not necessary to show, for rotating the advancers for the purpose of advancing the fruit along the upwardly inclined path and while it is essentially immaterial in which direction the advancers are rotated, still, it may be desirable to rotate them in a direction of rotation of the downwardly impelling cleaning roller. As shown by the arrows in Fig. 4, the roller 11, rotating in a clockwise direction, would be the downwardly impelling roller while the adjacent surface of roller 10, would be a lifting surface. Hence, in practice, I will rotate the spiral in a clockwise direction to afford any lifting action of the spiral adjacent the downward impelling action of roller 11. Of course, it will be understood, that all the spirals and all the rollers will rotate in a clockwise direction, viewing Fig. 4, and the distinction made as regards upward and downward impelling actions refers wholly to different directions of adjacent surface travel of the described parts.

I form the spirals, as regards pitch, in such a manner that the convoluted portions will span the largest size fruit entity and so that fore and aft of each entity, there will be convoluted portions so that in fact, the spirals will not only be advancing means but controlling means also, since the entity cannot advance beyond the convoluted portions between which it is interposed.

As will be seen by reference to Figs. 1, 3 and 4, the advancer 36, coacts with rollers 11 and 10, while advancer 37 coacts with rollers 10 and 9, and advancer 38, coacts with rollers 9 and 8. Thus, as before stated, there are three paths shown, along which the fruit is advanced. It will also be noted that the fruit entities are engaged by peripheral portions of the convolutions of the advancers, the interior portions of the latter being open and capable of receiving fruit that is large and projects upwardly. Because of the control exercised by the advancers, I am able to impart a relatively high speed of rotation to the rollers thereby obtaining a high frequency of contact with the fruit with a relatively short length of roller.

As the rollers revolve, with adjacent surfaces moving in opposite directions, the floating fruit entities are rolled and turned indiscriminately in all directions and all portions of the periphery of the fruit is most intensively but gently brought into wiping contact with the bristles. In addition to the turning and rolling movement imparted to the fruit by the rollers, it will be clear that as the advancer moves the fruit slowly forward, during the rolling movement imparted by the rollers, such advancing movement of the fruit will add an infinitude of movement to the latter. Thus, it will be seen that in a relatively short space of time, and a like short length of travel, I impart an intensive cleaning action of a most effective nature.

I will next describe the means and manner in which the cleaned fruit is uniformly delivered to the sorting conveyors, the latter being reduced in number with respect to the number of cleaning paths for the fruit.

I have shown two conveyors, one generally indicated at 39 and the other at 40. Each has a bottom wall 41 and 42, and side walls 43 and 44, as usual, and also the usual conveyor belts 45 and 46. The belts are trained over belt wheels, one being shown at 47, in Fig. 2, and of course the belts are maintained in motion to advance the fruit thereof and render it accessible to the sorters and graders or whatever operatives are employed. It will be noted that belt 45, is in line with advancer 38, and that belt 46, is in line with advancer 36, and that there is no belt in line with advancer 37. For various reasons, involving capacity and fluctuation of stock, it is not necessary to have as many conveyors as there are cleaners or cleaning paths. Hence, I will next explain one of the features of my invention where delivery from an uneven number of fruit paths may be uniformly made to a lesser and even number of conveyors.

As shown, a delivery board 48, is interposed between the egressing end of the cleaning rollers and the conveyors and I preferably incline said board sufficiently to cause the fruit to descend thereon by gravity. The intake or ontake edge of the board 48, as indicated at 49, is disposed in such relation to the delivery ends of the cleaning rollers that only a slight drop of the fruit is necessary from the rollers to said board. It will incidently be noted that the advancers are extended far enough to insure positive delivery of the fruit from off the ends of the cleaning rollers onto the board 48. The fruit from advancers 36 and 38, will roll down said board 48, guided by side walls 50, 51, 52 and 53, as will be clearly seen in Fig. 1. Of course the belts 45 and 46, will receive and advance the cleaned fruit, as before stated. It will now be clear that one conveyor belt has a capacity in excess of the capacity of any one advancer, and I will next describe novel divergence means whereby fruit delivered by the intermediate advancer 37, is uniformly or equally diverted toward the belts 45 and 46.

My improved diverting means includes a hub 54 rotatively mounted on a pin 55, fixed to board 48. Fixed on said hub 54, is a fruit deflecting gate 56 and two reversing wings 57 and 58. In the form shown, the gate and wings 56 and 57 and 58, respectively, are equi-distantly spaced, circumferentially speaking, although this is not an essential feature. However, the spacing of these parts is such that when the gate is in one deflecting position, one of the wings will be in a position, positively to reverse the device when a fruit entity strikes such wing. Therefore, some such spacing of the parts is essential. I have shown a stop stud 59, against which wing 57, is adapted to abut, to limit reversing movement of the device in one direction, and a like stop stud 60, for arresting wing 58. It will be noted that walls 51 and 52 are so arranged that after the fruit entity has come into contact with a wing, the entity will be prevented from rolling toward the center of the board 48 and out of ingressing alinement with the particular belt 45 or 46 toward which it is approaching.

Assuming that an apple has been discharged from advancer 47, onto board 48, the apple will roll down against gate 56, the latter being prevented from moving further in a contra-clockwise direction from the position shown in Fig. 1, by stop stud 60. The apple, after it contacts against gate 56, will roll down along side thereof until it reaches the abruptly projecting wing 57, against which the apple will abut, the force of the contact serving to reverse the device on pin 55 from the full line to the dotted line position, as shown in Fig. 1. Then the same, or rather, a reverse operation takes place, of the same general character, when the next apple descends. The device is made of very light material and is so easily turned that practically no friction opposes the action of the apples. Even if there happened to be a miss, or an incomplete cycle of operation, due to an extreme small apple, or due to an apple not rolling very fast, the next fruit entity, would start the device again.

It will now be clear that I have devised a fruit actuated diverter whereby the stream of fruit from an uneven number of fruit paths may be diverted from the odd path, to an even number of conveyors, less than the number of paths.

I will next describe the modified form shown in Figs. 6 and 7.

In this form, the receiver 61, with chutes 62, 63 and 64, is the same as in the preferred form. Likewise, the diverting device, the board and conveyors are the same, and have been given the same references, and therefore need not be described in detail.

I employ the same character of cleaning rollers also, and have indicated the same at 65, 66, 67 and 68, each having a shaft journalled in bearings numbered as in the preferred form.

The main distinction between this form and the preferred form is first; that no advancing means is employed in addition to the advancing action of the rollers themselves, and second; the rollers are arranged with their smaller ends 69 to 72, at the delivery end of said rollers and the larger ends 73 to 76, at the ontake end of said rollers. Thus, the actual fruit paths may be designated at 77, 78 and 79. By reason of this novel location of the conical rollers, the fruit paths are on a decline, from their ontake to their delivery ends, instead of on an incline, as in the preferred form. This decline, in actual practice may be varied to suit conditions, and in accordance with the rate of movement desired for the fruit.

In this form of the invention, the fruit entities will not be held in spaced relation although it will be clear that as the entities reach the fruit paths, they will inevitably take a single file order of movement and as their rate of longitudinal movement will be relatively slow, the rapid rotation of the cleaning rollers will effectively clean the fruit. It may be stated, that in this form, I will rotate the rollers in the same direction, and at the same rate of speed.

It is believed that the device of my invention will be clearly understood from the foregoing description and I do not wish to be limited thereto except for such limitations as the claims may import.

I claim:

1. In a fruit cleaning machine, cleaning rollers spaced to support and cause the interposed fruit to take a path of travel angular to the axes of rotation of said rollers, and means floatingly for advancing the fruit along said rollers to clean the fruit.

2. In a fruit cleaning machine, cone-shaped cleaning rollers in substantial peripheral contact at their larger ends and free from contact near their smaller ends and jointly supporting the fruit therebetween, and means for advancing the fruit along and between said rollers.

3. In a fruit cleaning machine, cone-shaped cleaning rollers rotating about parallel axes and the larger ends being in relatively close adjacency whereby the fruit path formed thereby will be angular to the axes of said rollers, and means rotating about an axis parallel with respect to said fruit path and angular to the axes of said rollers for advancing the fruit therebetween and therealong.

4. In a fruit cleaning machine, rotating cleaning members forming an inclined fruit path from their ontake toward their delivery ends, and screw-like advancing means disposed above and extending along said members for propelling the fruit lengthwise and between said members.

5. In a fruit cleaning machine, rotating cleaning rollers jointly forming a fruit path, and longitudinally extending spiral means disposed along said path for advancing the fruit lengthwise of said path.

6. In a fruit cleaning machine, coacting cleaning rollers jointly supporting the fruit therebetween and rotating in the same direction to impart a reverse direction of surface contact of said rollers with the interposed fruit, and means extending above and along said rollers and rotating in the same direction of rotation of said rollers for advancing the fruit therealong.

7. In a fruit cleaning machine, coacting cleaning rollers jointly supporting the fruit therebetween and rotating in the same direction to impart a reverse direction of surface contact of said rollers with the interposed fruit, and means for advancing the fruit along and between said rollers.

8. In a fruit cleaning machine, a pair of elongated convex soft wiping fruit supporting surfaces moving with respect to each other and in sufficient diverging relation to permit the supported interposed fruit to ascend therebetween from a maximum to a minimum wiping engagement with said surfaces, and means for advancing the fruit along said surfaces.

9. In a fruit cleaning machine, cleaning rollers jointly supporting the fruit therebetween, and spiral means floatingly advancing and controlling advancing movement of the fruit along said rollers to clean the fruit.

10. In a fruit cleaning machine, cleaning rollers jointly supporting the fruit therebetween, and an axially open spiral advancer extending along said rollers and having its convolutions spaced to accommodate the largest size fruit whereby the fruit will be floatingly actuated, said convolutions being adapted to engage the fruit therebetween to maintain the fruit entities in separated relation.

11. In a fruit cleaning machine, cleaning rollers jointly supporting the fruit therebetween, and a smooth surface spiral for advancing the fruit along said rollers.

12. In a fruit cleaning machine, rotating cone-shaped cleaning endwise discharging rollers supporting the fruit therebetween, and said rollers being substantially in contact at their larger ends and free from contact at their smaller ends, said rollers being spaced to arrest descent of fruit therebetween.

In testimony that I claim the foregoing as my own, I hereby affix my signature.

EDWARD A. WHITE.